United States Patent
Nakai et al.

(10) Patent No.: US 10,432,424 B2
(45) Date of Patent: Oct. 1, 2019

(54) RING NETWORK SYSTEM AND NETWORK NODE

(71) Applicant: HITACHI, LTD., Tokyo (JP)

(72) Inventors: Hidemasa Nakai, Tokyo (JP); Hiroshige Kashiwabara, Tokyo (JP); Hironori Adachi, Tokyo (JP); Atsushi Tanji, Tokyo (JP); Takuma Nishimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 15/358,930

(22) Filed: Nov. 22, 2016

(65) Prior Publication Data

US 2017/0155525 A1    Jun. 1, 2017

(30) Foreign Application Priority Data

Nov. 26, 2015    (JP) ................................. 2015-230194

(51) Int. Cl.
*H04L 12/437*    (2006.01)
*H04L 12/26*    (2006.01)

(52) U.S. Cl.
CPC ........ *H04L 12/437* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 6,766,482 B1 * | 7/2004 | Yip | ........................ | H04L 12/437 370/216 |
| 7,680,031 B1 * | 3/2010 | Luft | ...................... | H04L 12/437 370/222 |
| 8,717,879 B2 * | 5/2014 | Santos | .................. | H04L 12/437 370/216 |
| 2003/0165119 A1 * | 9/2003 | Hsu | ........................ | H04L 12/437 370/258 |
| 2004/0223503 A1 * | 11/2004 | Lynch | ..................... | H04L 12/42 370/404 |

(Continued)

FOREIGN PATENT DOCUMENTS

JP    4958746 B2    3/2012

OTHER PUBLICATIONS

ANSI/IEE Std 802.1D, 1998 Edition: 8. The Spanning Tree Algorithm and Protocol.

*Primary Examiner* — Ayaz R Sheikh
*Assistant Examiner* — Tarell A Hampton
(74) *Attorney, Agent, or Firm* — Volpe and Koenig, P.C.

(57) ABSTRACT

A ring network system is a ring network system in which a plurality of nodes including a blocking node that blocks transfer of a predetermined frame are connected in a ring shape, and when, any one of the plurality of nodes detects a change in a link state with an adjacent node, the node detecting the change transmits a collision frame for inquiring a collision of a blocking node to a current blocking node, and in accordance with a response from the current blocking node, a determination is made which of the nodes is to be a new blocking node, and in a case where the link state with the adjacent node has a higher priority level of blocking than a link state between the current blocking nodes, the node having detected the change transmits a collision frame for inquiring a collision of the blocking node.

4 Claims, 8 Drawing Sheets

| LINK STATE | BLOCKING PRIORITY ORDER |
|---|---|
| PHYSICAL LINK DISCONNECTION | 1 |
| TRANSMISSION QUALITY REDUCTION | 2 |
| LOGICAL LINK DISCONNECTION | 3 |

(56) References Cited

U.S. PATENT DOCUMENTS

| | | | | |
|---|---|---|---|---|
| 2005/0201409 | A1* | 9/2005 | Griswold | H04L 12/42 370/445 |
| 2005/0207348 | A1* | 9/2005 | Tsurumi | H04L 12/437 370/241 |
| 2006/0245351 | A1* | 11/2006 | Pande | H04L 12/1868 370/216 |
| 2007/0253330 | A1* | 11/2007 | Tochio | H04L 12/423 370/222 |
| 2009/0147675 | A1* | 6/2009 | Sekihata | H04L 12/42 370/225 |
| 2009/0296569 | A1* | 12/2009 | Ramalho Ribeiro Dos Santos | H04L 12/437 370/222 |
| 2010/0110881 | A1* | 5/2010 | Ryoo | H04L 12/42 370/225 |
| 2010/0195508 | A1* | 8/2010 | Ling | H04L 12/437 370/248 |
| 2010/0260040 | A1* | 10/2010 | Wu | H04L 12/437 370/223 |
| 2010/0265817 | A1* | 10/2010 | Kuwata | H04L 12/437 370/217 |
| 2010/0290340 | A1* | 11/2010 | Lee | H04L 12/437 370/225 |
| 2011/0007628 | A1* | 1/2011 | Tochio | H04L 12/437 370/224 |
| 2011/0019538 | A1* | 1/2011 | Ryoo | H04L 12/437 370/225 |
| 2012/0155245 | A1* | 6/2012 | Zhang | H04L 12/437 370/216 |
| 2013/0272128 | A1* | 10/2013 | Lee | H04L 47/12 370/235 |
| 2014/0254347 | A1* | 9/2014 | Xie | H04L 12/437 370/218 |

* cited by examiner

FIG. 3

| LINK STATE | BLOCKING PRIORITY ORDER |
|---|---|
| PHYSICAL LINK DISCONNECTION | 1 |
| TRANSMISSION QUALITY REDUCTION | 2 |
| LOGICAL LINK DISCONNECTION | 3 |

FIG. 4

| BLOCKING NODE | LINK STATE |
|---|---|
| NODE 4, NODE 5 | LOGICAL LINK DISCONNECTION |

RING NETWORK SYSTEM AND NETWORK NODE

BACKGROUND OF THE INVENTION

1. Field of the Invention

The present invention relates to a ring network system and a network node.

2. Description of the Related Art

Ethernet (registered trademark) in layer 2 defined by IEEE 802.3 is available as an aspect of a network such as a switching hub that learns MAC address information in a reception frame and is configured by connecting a network apparatus controlling a transmission destination of a frame.

As a protocol for giving redundancy to a network configuration based on Ethernet, ANSI/IEEE Std 802.1D, 1998 Edition: 8. The Spanning Tree Algorithm and Protocol describes STP (Spanning Tree Protocol). In the STP, a control frame called BPDU (Bridge Protocol Data Unit) is exchanged with a regular interval, and a state called blocking is set in a port on a network, so that an occurrence of a loop in Ethernet is prevented. A path switching is realized by cancelling the blocking upon detecting a change in a state of the network (topology) on the basis of a link failure occurrence and the like.

Japanese Patent No. 4958746 recites that "each node on a network is provided with a transmission quality monitor unit 35 monitoring a transmission quality of the node with a regular interval, a transmission quality management table 42 storing the monitored transmission quality, a termination determination unit 39 determining a termination portion on the basis of information in the transmission quality management table 42, and a node state management unit 40 managing a node state of the node. Each node transmits the transmission quality information about the node monitored by the transmission quality monitor unit 35 to all the nodes, so that the transmission qualities about all the nodes on the network are stored in the transmission quality management table 42 to be shared, and on the basis of a comparison result of the transmission qualities, a node having the worst transmission quality is determined to be a termination portion" (see Abstract).

SUMMARY OF THE INVENTION

According to the technique described in Japanese Patent No. 4958746, in a network system connected in a ring shape, the node having the worst transmission quality is determined to be the termination portion, so that the throughput of the entire network can be improved.

On the other hand, in a case where there is already another blocking node on a ring network, it is necessary to block the corresponding port of the node in which a reduction in the transmission quality is detected, and start collision with a conventional blocking node existing on the ring in order to cause the node in which the reduction in the transmission quality is detected to transit to another blocking node. However, in a case where a cable connected to a conventional blocking node is snapped, or the cable is detached from the port, the link with the adjacent node is physically disconnected, and therefore, the blocking cannot be cancelled. For this reason, as a result, a transmission quality reduction detection node loses in the collision, and cancels the blocking that is once executed. Because of this collision, there is a problem in that the user communication is temporarily disconnected for a communication disconnection time dependent upon the configuration control method.

The present invention is made in view of the above problem, and it is an object of the present invention to provide a network system and the like that prevents unnecessary user communication disconnection and improves the availability of a ring network even in a case where a predetermined abnormality occurs in a communication between nodes of the ring network.

In order to solve the problem, a typical ring network system according to the present invention is a ring network system in which a plurality of nodes including a blocking node that blocks transfer of a predetermined frame are connected in a ring shape, and when, any one of the plurality of nodes detects a change in a link state with an adjacent node, the node detecting the change transmits a collision frame for inquiring a collision of a blocking node to a current blocking node, and in accordance with a response from the current blocking node, a determination is made which of the nodes is to be a new blocking node, and in a case where the link state with the adjacent node has a higher priority level of blocking than a link state between the current blocking nodes, the node having detected the change transmits a collision frame for inquiring a collision of the blocking node.

According to the present invention, even in a case where a predetermined abnormality occurs in a communication between nodes of the ring network, collision is started only in a case where a node can win in the collision with a high degree of possibility, so that unnecessary user communication disconnection can be prevented, and the availability of the ring network can be improved.

BRIEF DESCRIPTION OF THE DRAWINGS

FIG. 3 is a figure illustrating a content of blocking precedence information;

FIG. 4 is a figure illustrating a content of ring state information;

DESCRIPTION OF THE PREFERRED EMBODIMENTS

Hereinafter, a configuration control procedure according to the present embodiment will be explained. The configuration control procedure according to the present embodiment is provided to prevent an unnecessary user communication disconnection by starting collision only in a case where a node can win in the collision with a high degree of possibility when a link quality reduction is detected in a ring-type network.

Figure 1:
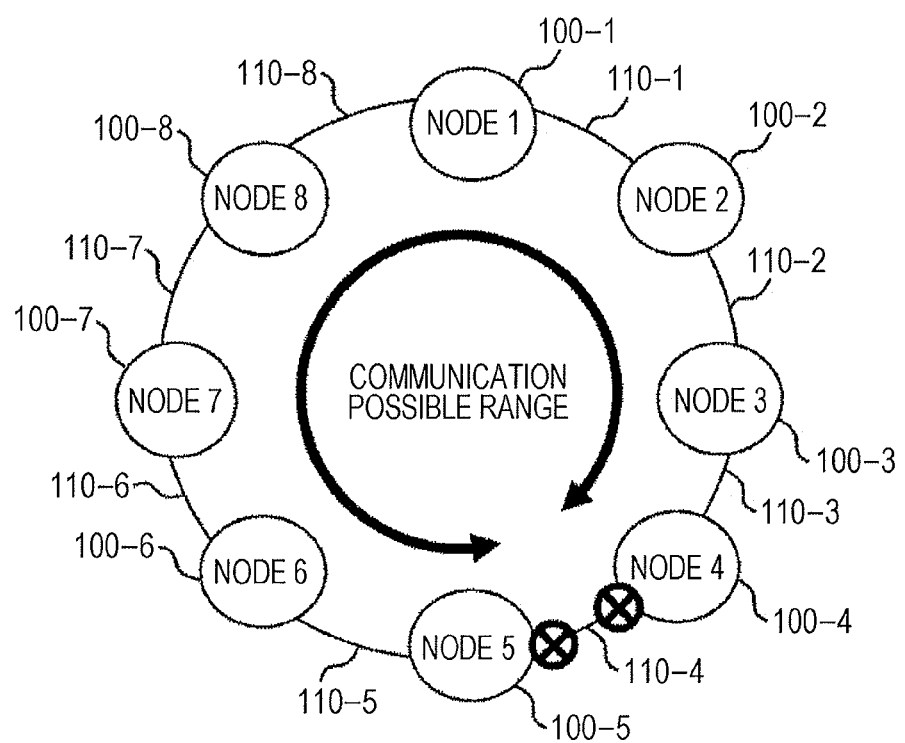
FIG. 1 is a configuration diagram illustrating a ring network according to the present embodiment.

FIG. 1 is a configuration diagram illustrating the present embodiment. In the configuration content, there are eight nodes (100-1 to 8) connected to a ring-type network via communication lines (110-1 to 8), and a calculator, not shown, is connected to the branch lines of the nodes (100-1 to 8). A state between the node 4 (100-4) and the node 5 (100-5) is in the blocking state. The blocking state is such that, while a communication other than a control frame for controlling the ring-type network is shut off, for example, communication frames between calculators connected to the branch lines of the nodes are shut off, so that in the network, the blocking state always exists in a certain section on the ring, and this prevents a loop.

Examples of control frames include a frame communicated between adjacent nodes to monitor failure of communication lines (110-1 to 8), a frame declaring that a transition to a blocking node is made due to a failure occurrence of communication lines (110-1 to 8), a collision frame arbitrating collisions in a case where multiple blocking nodes are colliding in the network, a frame storing a port state of each node and for finding a current state of the ring network, and the like. It is assumed that any abnormality does not occur in all of the nodes (100-1 to 8) and the communication lines (110-1 to 8). A state in which communication frames are logically blocked for preventing of a loop even though the ring network is normal will be defined as a "logical link disconnection" state.

Figure 2:
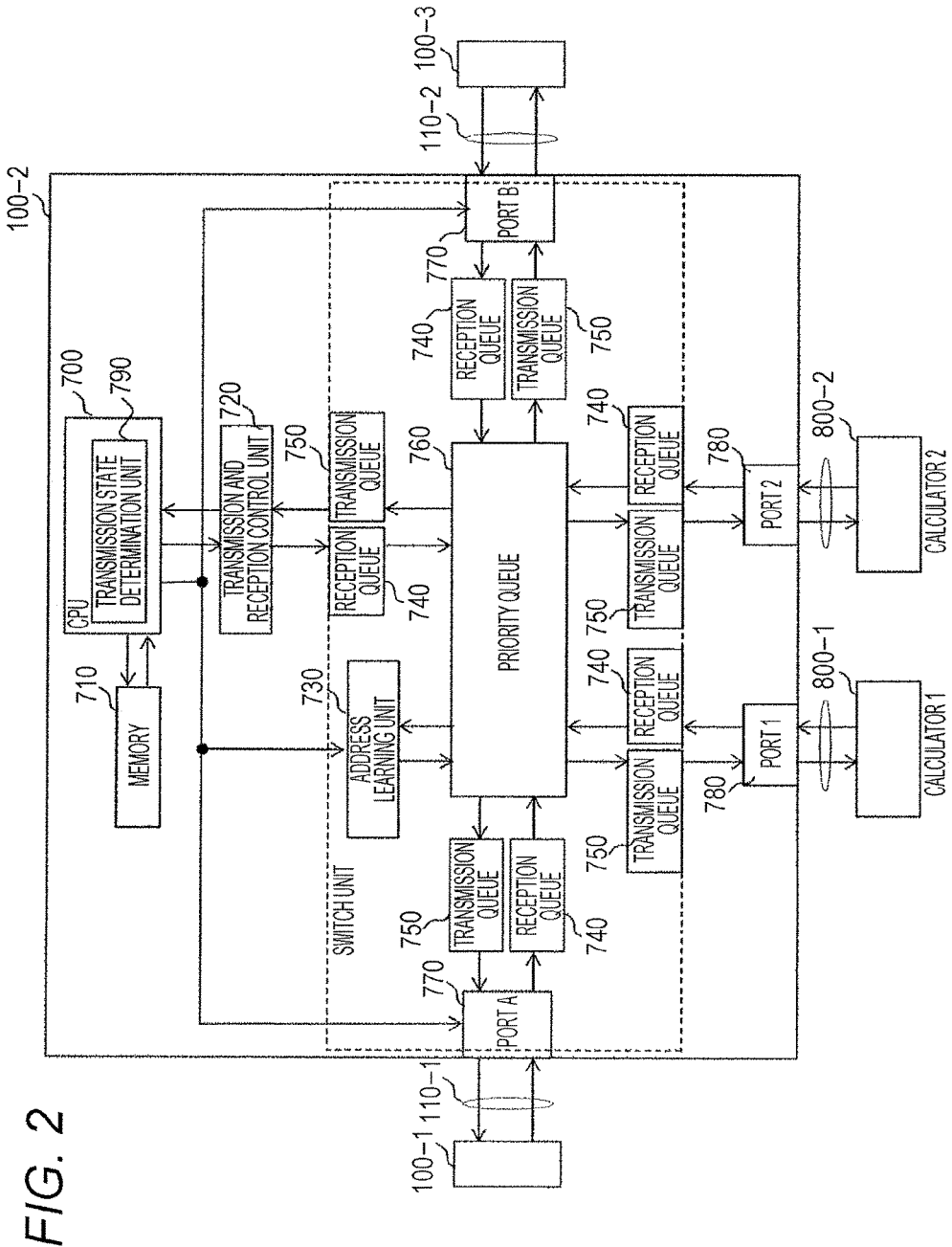
FIG. 2 is an internal block diagram illustrating a node of the ring network according to the present embodiment.

FIG. 2 is a figure illustrating an internal block diagram illustrating nodes (100-1 to 100-8) in FIG. 1. In FIG. 2, the node 2 (100-2) will be explained as an example.

The node 2 (100-2) is connected to the node 1 (100-1) the node 3 (100-3) via the communication lines (110-1, 2), and is connected to the calculator 1 (800-1), the calculator 2 (800-2) via branch lines. In this example, two calculators are connected as an example, but three or more calculators may be connected.

The node 2 (100-2) includes a CPU (700), a memory (710), a transmission and reception control unit (720), and multiple port (770, 780) switch units. The switch unit includes a reception queue (740) storing a received frame, a priority queue (760) classifying frames in accordance with the priority, a transmission queue (750) storing a transmitted frame, and an address learning unit (730) storing MAC address information.

The ports A, B (770) are ports for constituting the ring network, and totally two ports are provided for a node. The ports A, B (770) carries out and cancels blocking in response to a command from a CPU (700).

The ports 1, 2 (780) are ports for connecting calculators and the like to the branch lines. Any number of ports may be provided, but in this example, two ports are shown.

A reception queue (740) is a queue for storing frames received from the ports (770, 780). A single reception queue (740) is provided for each port. A reception queue (740) is also provided to store frames received from the transmission and reception control unit (720). The reception queue (740) includes multiple queues in the inside thereof, and changes the stored queue in accordance with the priority of the reception frame.

In the priority queue (760), each individual queue is provided for each of the priority levels (0 to 7 in the present embodiment), and a frame is transferred from the reception queue (740) of each port to the queue corresponding to the priority level. Then, a frame in the priority queue is transferred to the transmission queue of the destination port on the basis of the destination MAC address of the frame and information in the address learning unit (730) of the switch unit.

A transmission queue (750) is a queue for transmitting a frame from the port in the order of the priority level. A single transmission queue (750) is provided for each port. A transmission queue (750) is also provided to store a frame transmitted to the transmission and reception control unit (720). A frame having a priority level 7, which is the highest order in the priority, is transmitted in a preferential manner, and a frame having a lower priority level is kept waiting until all the frames having higher priority levels are finished being transmitted.

Each node transmits and receives a control frame of a state confirmation requirement to and from an adjacent node via the ports A, B with a regular interval (for example, 10 millisecond interval). The CPU (700) includes a transmission state determination unit (790) monitoring a control frame received by the adjacent node for each of the ports A, B, and in a case where the transmission state determination unit (790) does not receive a control frame from the adjacent node for a certain period of time or more (for example, 200 milliseconds and the like), the transmission state determination unit (790) determines that a physical link failure occurs in the port. This state is defined as a "physical link disconnection" state. In a case where the transmission state determination unit (790) cannot receive control frames intermittently (for example, the transmission state determination unit (790) cannot receive a control frame about once in ten times) even though the state does not transit to the physical link disconnection state, the transmission quality of the port is determined to have been reduced. This state will be defined as a "transmission quality reduction" state.

The transmission and reception control unit (720) has a function of receiving a frame from the switch unit and storing the frame to the memory. In addition, the transmission and reception control unit (720) has a function of transmitting frame information generated on the memory as a frame to the switch unit in accordance with a command from the CPU (700).

The memory (710) is a memory for storing information about a frame received by the CPU from the transmission and reception control unit and a frame transmitted by the CPU. In addition, the memory (710) also stores a program according to which the CPU operates. Further, in the present embodiment, the memory (710) stores blocking precedence information indicating corresponding relationship between a link state between nodes and precedence for performing blocking and ring state information indicating a link state of a blocking node in the ring network.

FIG. 3 is a figure illustrating a content of blocking precedence information possessed by each node. In the blocking precedence information, a link state between nodes and a blocking priority order of each link state are stored in association with each other. In the present embodiment, there are three types of link states, i.e., "physical link disconnection", "transmission quality reduction", and "logical link disconnection", and the priority order of blocking is set to be higher in the following order: "physical link disconnection", "transmission quality reduction", and "logical link disconnection". For example, in a case where there exist two link states, i.e., "physical link disconnection" and "transmission quality reduction" in the ring network, a connection between the nodes in the "physical link disconnection" having a high priority level is blocked.

FIG. 4 is a figure illustrating a content of ring state information held by each node. The ring state information stores node information about a current blocking node in the ring network and a link state of the blocking node in association with each other. FIG. 4 indicates that the node 4 and the node 5 are blocking nodes, and the link state between the nodes 4 and 5 is "logical link disconnection". Although not shown, the ring state information includes information indicating how each of other nodes constituting the ring network is connected and information indicating the IP address of each node.

The update of the ring state information is executed with a predetermined interval (about three seconds in the present embodiment). In the update method, one blocking node transmits a ring state request frame in a single direction with a predetermined interval, and each node having received the ring state request frame stores a link state of the node in question into the ring state request frame and transfers the ring state request frame to a subsequent node. As described above, when the ring state request frame storing information about all the nodes in the ring network is delivered to the other blocking node, the other blocking transmits in turn a ring state update frame storing information about all the nodes in the opposite direction. Then, each node having received the ring state update frame refers to the information, so that each node can update the ring state information about the node.

Figure 5:
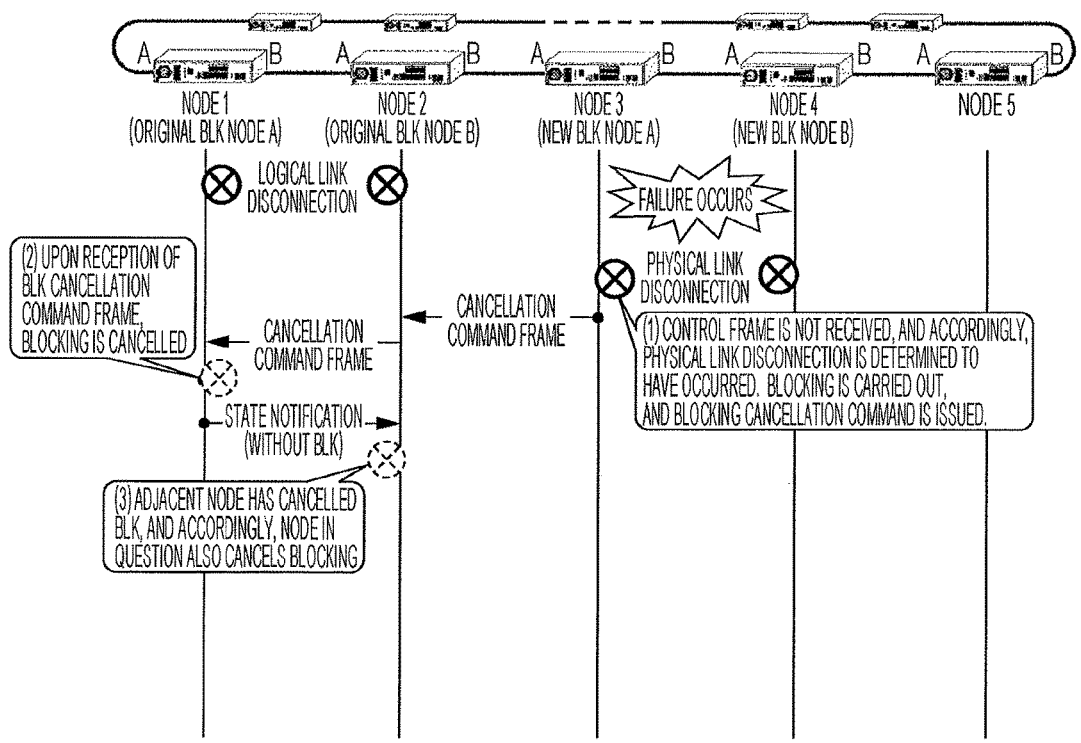
FIG. 5 is a figure illustrating an operation in a case where a physical link disconnection occurs.

FIG. 5 illustrates an example of operation of each node in a case where a physical link disconnection occurs due to a LINK failure from a normal state. In an initial state, the ring network is normal, and the node 1 and the node 2 are blocking node for preventing a loop and are in the logical link disconnection state. In this example, a node blocking "port B" is a node that carries out collision with another node, and a node blocking "port A" is a node that performs blocking in the depending manner, and no collision is carried out. In the initial state of FIG. 5, the blocking of the node 2 is making a blocking of "port A", and "port B" of the node 1, i.e., an adjacent node, is performing blocking, and therefore, a blocking in the depending manner is carried out. When a collision occurs, the node 1 blocking "port B" carries out collision. In the initial state in which a collision does not occur, a control frame for sharing the port state of the node with each other is transmitted and received, and in the initial state, each node is assumed to recognize that the current ring state is "normal".

In (1) in FIG. 5, a failure occurs between the node 3 and the node 4, and the node 3 and the node 4 that have not received a control frame from an adjacent node for a certain period of time or longer block their ports. In this occasion, the node 3 blocking the port B transmits a "cancellation command frame" for cancelling the original blocking portion. Subsequently, in (2), the node 1 receives the "cancellation command frame", so that the node 1 can cancel the blocking port of the node 1. It should be noted that the "cancellation command frame" is a type of a control frame, and is not blocked by the node 2. Therefore, in (3), the node 2 having detected blocking cancellation of the node 1 with a state notification transmitted from the node 1 also cancels the blocking in the depending manner. As a result, the communication is recovered.

Figure 6:
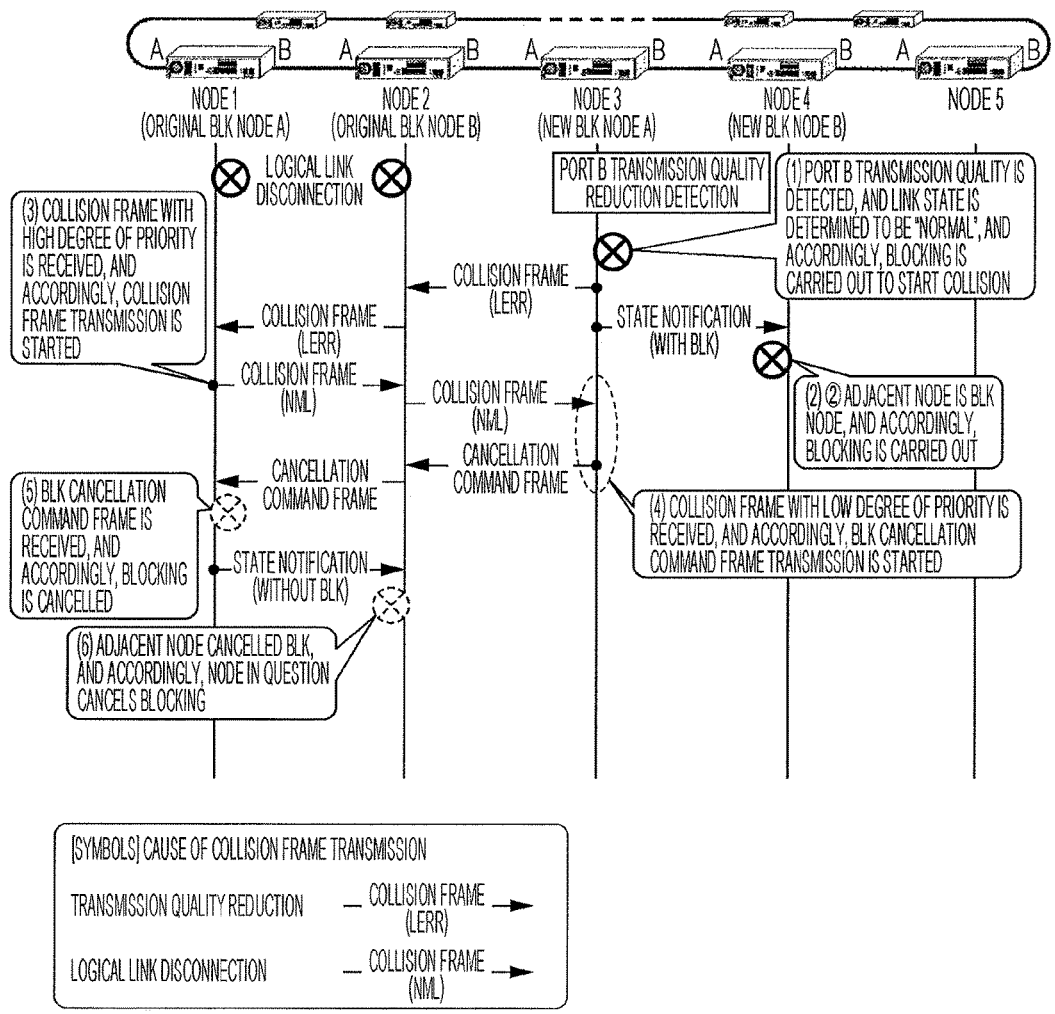
FIG. 6 is a figure illustrating an operation in a case where a transmission quality reduction occurs.

Subsequently, FIG. 6 illustrates an example of operation of each node in a case where a transmission quality reduction is detected from a normal state. Like FIG. 5, the node 1 and the node 2 makes the logical link disconnection state into an initial state. In (1) in FIG. 6, the node 3 detects a transmission quality reduction at the port B. The node having detected the transmission quality reduction recognizes that the current ring state is "normal" from the ring state information of itself, and therefore, the node starts collision by blocking the port B. In (2), the node 4 detects that the adjacent node carries out blocking from the state notification from the node 3, and the node 4 blocks the port A. In (3), the node 1 which is the original port B blocking node has received a collision frame (LERR) of which priority level is higher than the state of the node 1 (logical link disconnection), and accordingly, the node 1 starts collision (loses in the collision), and therefore, the node 1 transmits a collision frame (NML). In FIG. 6, a collision frame due to a transmission quality reduction is referred to as a collision frame (LERR), and a collision frame due to a logical link disconnection is referred to as a collision frame (NML). In (4), the node 3 having received a collision frame (NML) having a lower priority level from the node 1 determines that the node 3 has won in the collision, and transmits a "cancellation command frame" to the node 1. In (5), when the node 1 receives the "cancellation command frame", the node 1 cancels the blocking port of the node 1. Accordingly, the node 2 having detected the blocking cancellation of the node 1 in (6) also cancels the blocking in the depending manner. As a result, the communication is recovered.

Figure 7:
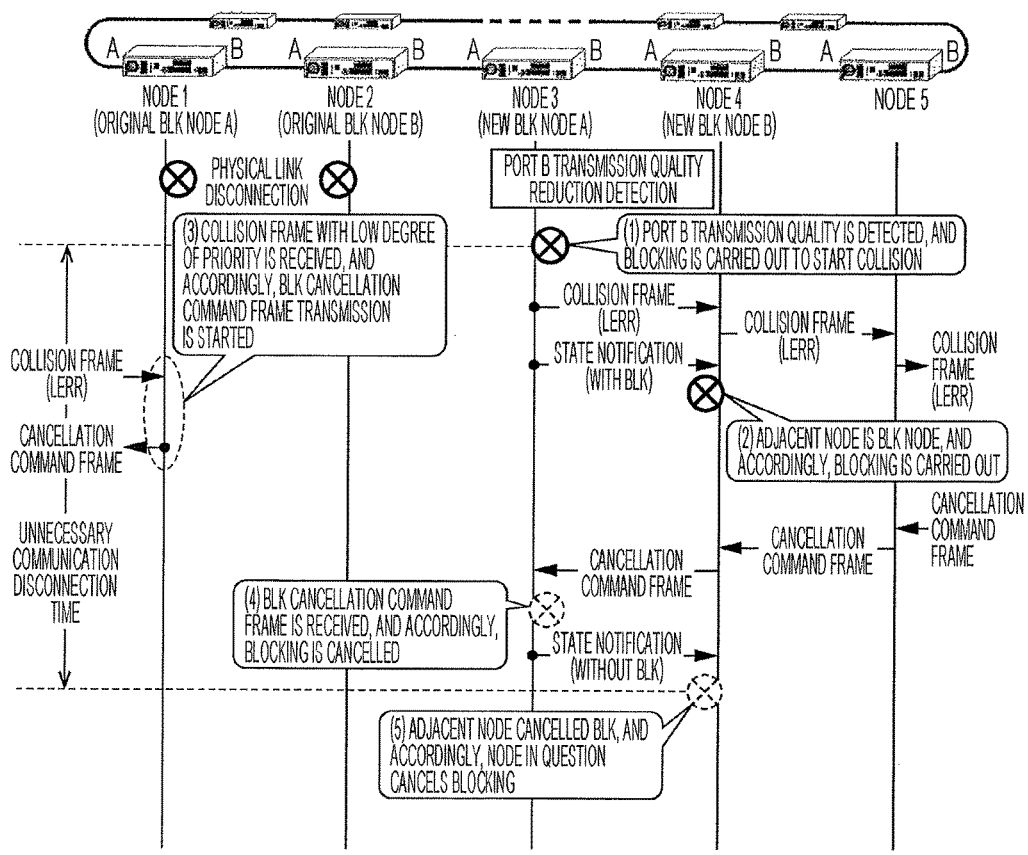
FIG. 7 is a figure illustrating an operation in a case where a transmission quality reduction occurs during a ring state abnormality (the present invention is not applied)

Subsequently, FIG. 7 illustrates an example where a problem is caused when the present invention is not applied. In this example, a failure occurs in a transmission path between the node 1 and the node 2, and the node 1 and the node 2 are assumed to be in a "physical link disconnection" state. In this state, the node 3 detects a transmission quality reduction of the port B in (1), so that the node 3 carries out the blocking to start collision, and transmits a collision frame (LERR). In (2), the node 4 blocks the port A in a depending manner upon a state notification from the node 3. However, the node 1 having received the collision frame from the node 3 in (3) detects the physical link disconnection state by itself, and the priority level of the blocking is as follows: physical link disconnection>transmission quality reduction. Therefore, the node 1 maintains the blocking of the node 1, and transmits a "cancellation command frame" to the node 3. In (4), the node 3 having received the "cancellation command frame" cancels the blocking of the node 3, and in (5), the blocking of the node 4 detecting the cancellation of the blocking upon the state notification from the node 3 is also cancelled. Accordingly, the communication is recovered, but the communication may be cut off in the period from (1) to (5). More specifically, there is a problem in that an unnecessary collision occurs from when the node 3 detects a transmission quality reduction in (1) to when the communication is recovered in (5).

Figure 8:
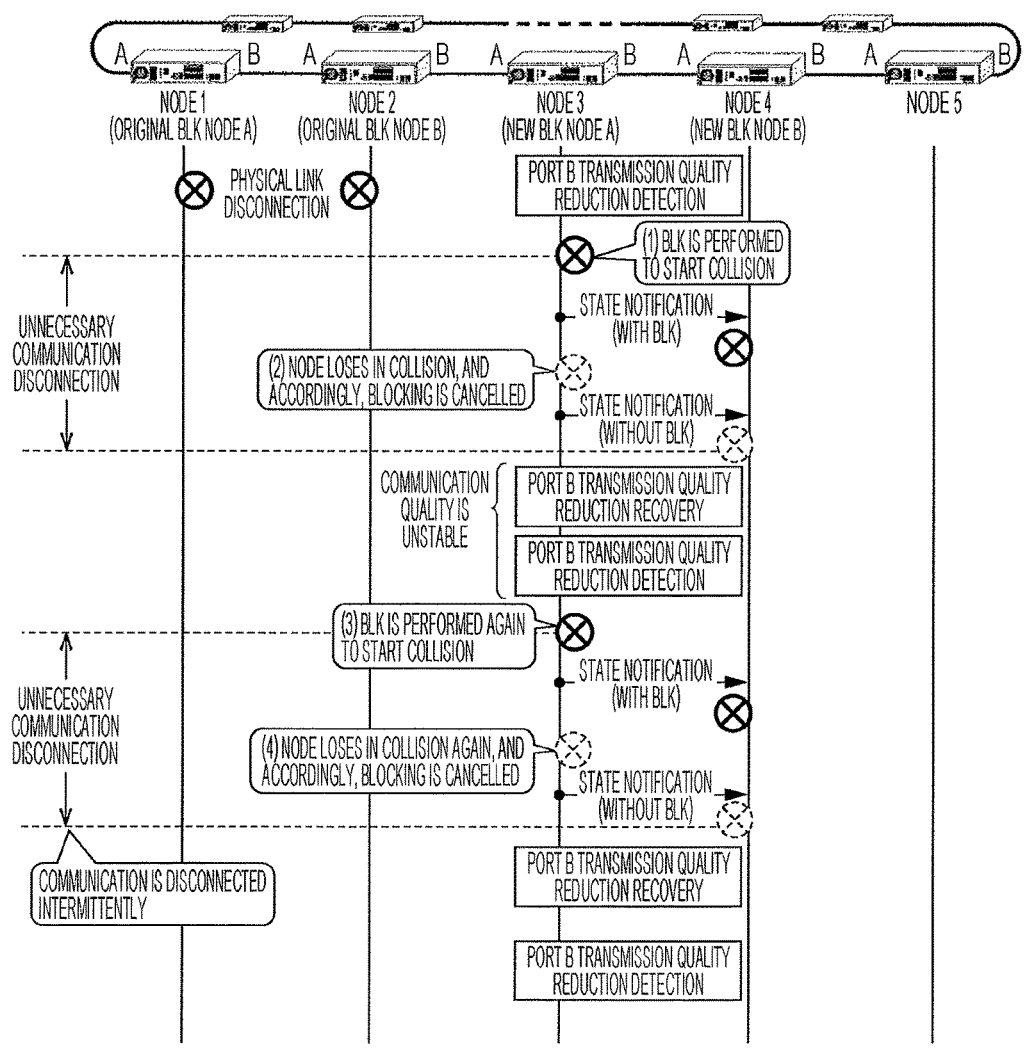
FIG. 8 is a figure illustrating an operation in a case where a transmission quality reduction repeatedly occurs during a ring state abnormality (the present invention is not applied)

Subsequently, FIG. 8 illustrates an example where a further delay may occur in a case where the present invention is not applied. FIG. 8 illustrates a case where the transmission quality is in an unstable state at around a threshold value for detecting a transmission quality reduction. Like the example of FIG. 7, in (1), the node 3 detects a transmission quality reduction at the port B to start collision, and the node 4 also carries out the blocking in the depending manner. However, in (2), a physical link is disconnected between the node 1 and the node 2, and therefore, the node 3 loses in the collision with the node 1 and cancels the blocking, and the node 4 also cancels the blocking in the depending manner, so that the communication is recovered. In this case, when the transmission quality between the node 3 and the node 4 is unstable, the transmission quality may be reduced again even if the transmission quality is once recovered. In such case, the node 3 detects the transmission quality reduction of the port B again in (3) to start a collision, and the node 4 also carries out the blocking in the depending manner. However, in (4), the node 3 loses in the collision with the node 1 and cancels the blocking, and the node 4 cancels the blocking in the depending manner, so that the communication is recovered.

As described above, when the transmission quality is unstable, the transition between the "quality reduction detection" and the "transmission quality recovery" is repeated at the same port, and on every occasion, collision start and collision loss are repeated. In this case, an intermittent communication failure may occur throughout the ring network.

For example, in a node configuration as that in the present embodiment, the time of communication disconnection caused by a single collision is about 500 ms, and in an industrial network requiring a real time property of communication, this is desired to be improved.

Figure 9:
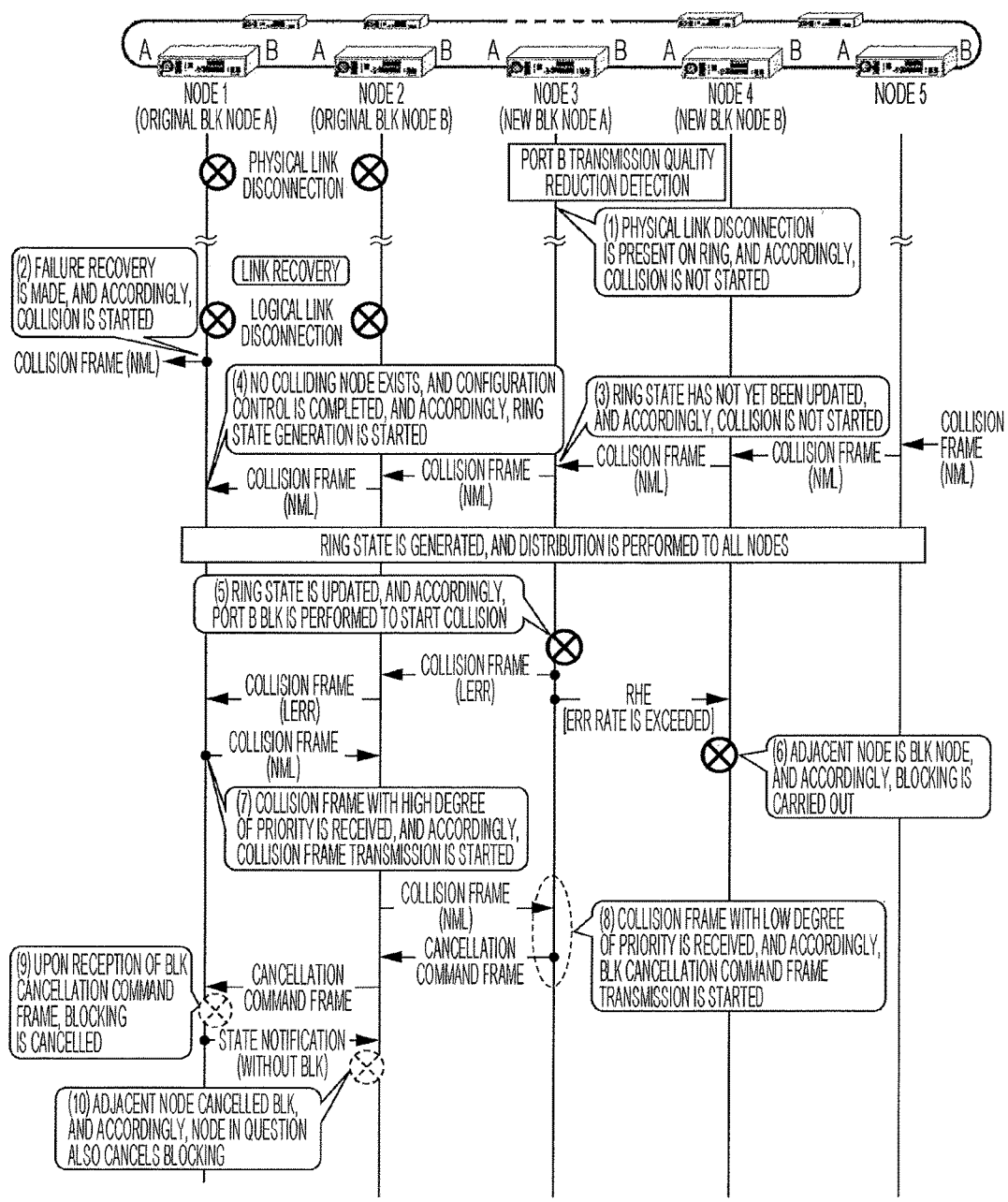
FIG. 9 is a figure illustrating an operation in a case where a transmission Quality reduction occurs during a ring state abnormality (the present invention is applied).

An example in a case where the present invention is applied under similar conditions is shown in FIG. 9. Like FIGS. 7, 8, in the initial state, a failure occurs between the node 1 and the node 2, and the physical LINK state is detected. In this state, in a case where the node 3 detects the transmission quality reduction of the port B in (1), the node 3 refers to the ring state information held by the node 3, and recognizes that the current ring state is in an "abnormality (physical link disconnection)" state. Subsequently, the node 3 refers to the blocking precedence information and recognizes that the "transmission quality reduction" state detected by the node 3 has a lower priority level of blocking than the "physical link disconnection" state which is a link state of the current blocking, so that the blocking is not carried out, and the collision is not started. In this example, the collision is not carried out because the "physical link disconnection" state is detected in another node (blocking because the priority level is higher than the state of itself), but the blocking and collision are not carried out either in a case where a blocking is carried out in the "transmission quality reduction" already occurs in another node (=blocking in the same procedure as the state of itself). Accordingly, a communication disconnection due to unnecessary collision can be prevented. Like the example as shown in FIG. 8, the collision is not started either in the case where the transmission Quality changes intermittently, so that an occurrence of intermittently communication failure can be prevented.

In a case where the transmission failure between the node 1 and the node 2 is recovered in this example (2), the state of the port B of the node 1 changes from the "physical link disconnection" to the "logical link disconnection", so that a confirmation is made as to whether a physical link disconnection is detected or not in another node, and therefore, a collision frame (NML) is transmitted and a collision is started (in a case where a physical link disconnection is detected in another node, the node in question loses in the collision, and cancels the blocking). In (3), the node 3 receives the collision frame (HTML) having a lower priority level than the node 3, but the current ring state information held by each node has not yet been updated, and the node 3 recognizes that the connection between the node 1 and the node 2 is still a "physical link disconnection" state, and therefore, the node 3 does not start the collision. In (4), the node 1 having determined that there is no collision node stops the collision, and updates the ring state and distributes the ring state information to all the nodes. In (5), the ring state information held by the node 3 is updated, and the node 3 recognizes that the current ring state is "normal". Accordingly, the port B of itself is blocked, and the collision is started. Thereafter, like FIG. 6, in (6), the node 4 detects that the adjacent node carries out the blocking from the state notification from the node 3, and blocks the port A. In (7), the node 1 which is the original port B blocking node receives a collision frame (LERR) having a priority level higher than the state (logical link disconnection) of the node 1, and accordingly, the node 1 starts a collision (a collision to lose), and transmits a collision frame (NML). In (8), the node 3 having received a collision frame (NML) having a lower priority level from the node 1 determines that the node 3 has won in the collision, and the node 3 transmits a "cancellation command frame" to the node 1. In (9), the node 1 receives a "cancellation command frame", and cancels the blocking port of itself. As described above, a collision is started only in a case where a node can win in the collision with a high degree of possibility, so that an unnecessary user communication disconnection can be prevented, and the availability of the ring network can be improved.

The present invention is not limited to above embodiments, and various modifications are included. For example, the above embodiments are provided to explain the present invention in details in an easy to understand manner, and the present invention is not limited to those having all the constituent elements explained. Some or all of the above configurations, functions, processing units, processing means, and the like may be realized with hardware by designing an integrated circuit, for example. The above configuration, functions, and the like may be realized with software by causing a processor to interpret and execute a program achieving the functions. Information such as the programs, tables, files, and the like for achieving the functions can be placed in a recording device such as a memory, a hard disk, an SSD (Solid State Drive) and a recording medium such as an IC, an SD card, and a DVD.

What is claimed is:

1. A ring network system, comprising:
a plurality of nodes connected in a ring shape that includes a blocking node that blocks transfer of a predetermined frame wherein, any node from the plurality of nodes can detect a change in a link state with an adjacent node, wherein a link state between the blocking nodes is any one of a physical link disconnection state in which a link failure occurs in a physical manner, a transmission quality reduction state in which a transmission quality of a link is reduced, and a logical link disconnection state which is a normal link connection state; and
wherein a particular node from the plurality of nodes that detects the change in a link state with an adjacent node transmits a collision frame to a current blocking node, and in accordance with a response from the current blocking node, a determination is made which of the nodes is to be a new blocking node based on a link state priority level;
wherein the priority level of the blocking is set from highest to lowest in a following order; the physical link disconnection state, the transmission quality reduction state, and the logical link disconnection state.

2. The ring network system according to claim 1, wherein any one of the plurality of nodes stores ring state information indicating which state the link state of the blocking node in the ring network is, and
only in a case where the link state of the adjacent node has a higher priority level of blocking than the link state between the current blocking nodes based on the ring state information, the node detecting the change in the link state transmits the collision frame.

3. The ring network system according to claim 2, wherein in a case where the link state between the current blocking nodes is the physical link disconnection state when any one of the nodes detects a reduction in the transmission quality of the link, and thereafter the link state between the current blocking nodes changes to the logical link disconnection state, the current blocking node transmits a frame indicating that the ring state information is updated to another node, and the node having detected the reduction in the transmission quality transmits the collision frame to the current blocking node when the ring state information is updated.

4. A network node constituting a ring network, comprising:

a storage unit for storing ring state information that indicates a plurality of predetermined states such as a physical link disconnection state in which a link failure occurs in a physical manner, a transmission quality reduction state in which a transmission quality of a link is reduced, and a logical link disconnection state which is a normal link connection state;

the storage unit for storing ring state information further indicates a link state between blocking nodes, that are nodes in the ring network that blocks a transfer of a predetermined frame and provides blocking precedence information indicating a priority level for performing blocking in each of the plurality of predetermined states, wherein the blocking precedence information is configured so that a priority level of blocking is set from highest to lowest in a following order; the physical link disconnection state, the transmission quality reduction state, and the logical link disconnection state; and a control unit, when a change in a link state with an adjacent node is detected, transmits a collision frame to a current blocking node; and the control unit determines if the adjacent node has a higher priority level of blocking than the link state between the current blocking nodes based on the ring state information and the blocking precedence information.

* * * * *